Figure 1:
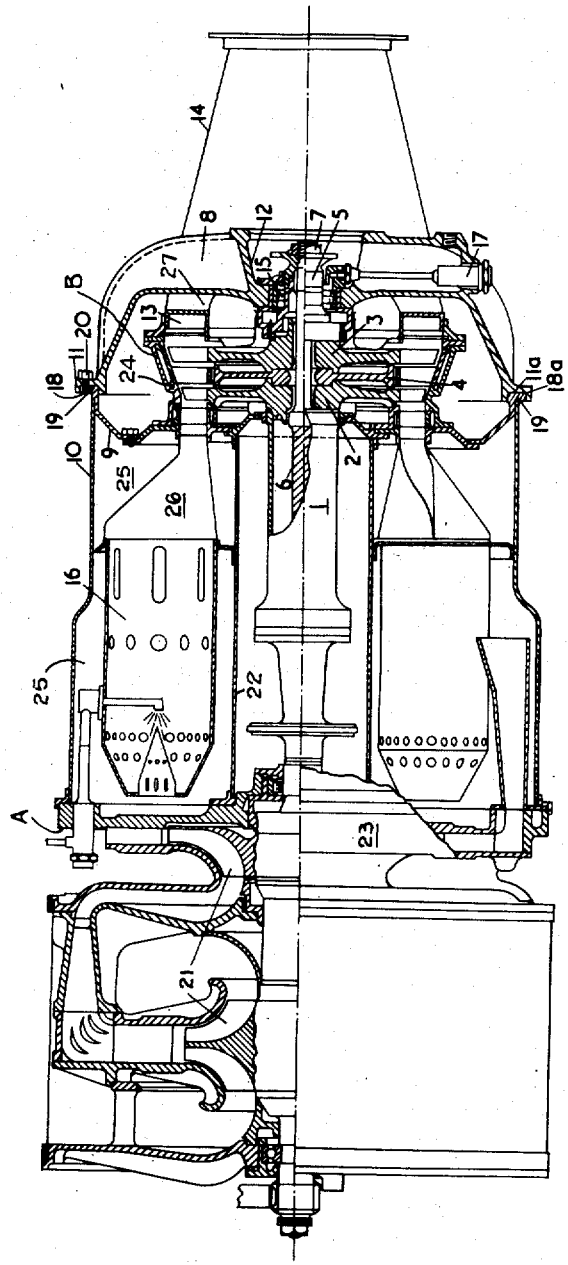

United States Patent Office 2,695,499
Patented Nov. 30, 1954

2,695,499

GAS TURBINE POWER UNIT

Daniel Norman Walker, Kenilworth, England, assignor to Power Jets (Research and Development) Limited, London, England, a British company Application August 22, 1949, Serial No. 111,619

3 Claims. (Cl. 60—39.31)

This invention relates to gas turbine power units and is concerned in particular with such units of the type comprising a co-axial compressor and turbine, having a combustion system annularly arranged about and enclosing a shaft connecting the compressor and turbine. In an arrangement of this general form the provision of a rear bearing for the compressor-turbine shaft is something of a problem in view of the absence of adequate supporting structure in the turbine exhaust system, and the need for minimising interference with the flow of the turbine exhaust. The use of an overhung turbine (that is with the turbine bearing on the upstream side of the wheel) offers a solution in some cases with the concurrent advantages that there is no interference with the turbine exhaust and that the bearing is enabled to be properly integrated with the general structure of the unit. The overhung arrangement of the turbine is not, however, suitable in all cases, and in particular in the case of a small high speed unit where the space within the annulus of the turbine and combustion system is very limited and difficulties may be encountered in avoiding critical whirling speeds. The enclosure of the rear bearing by the combustion system and turbine is generally disadvantageous in some respects, and in a small high speed unit may be quite impracticable. It is an object of the present invention to provide a satisfactory arrangement permitting the employment of a downstream or outboard rear bearing for the turbine which will be particularly suited to a small high speed unit of the kind referred to.

An outboard bearing must, of necessity, be supported from the stator structure of the unit, but merely to provide support by a direct connection between the bearing housing and the high temperature turbine working fluid ducting has the disadvantage of rendering difficult the prevention of heat transfer from the working fluid to the bearing.

Accordingly the invention proposes a gas turbine power unit of the kind referred to, wherein the turbine is mounted in an outboard bearing of which the housing is supported by external attachment to the outer wall of the turbine working fluid ducting in the vicinity of the turbine, to the exclusion of support by radially intermediate structure of said ducting.

The invention, alternatively stated, proposes a gas turbine power unit of the kind referred to wherein the turbine is mounted in an outboard bearing of which the housing is devoid of any major structural connection with high temperature elements of the working fluid ducting and is supported by attachment to lower temperature parts of the stationary structure external to said ducting.

According to a further feature of the invention, the attachment means of said bearing housing to the external structure is screened from direct contact with the exhaust gases.

In a preferred constructional embodiment of the invention the unit is provided with a divided exhaust duct between the limbs of which the attachment means pass. Thus, in a suggested form of the invention there may be an exhaust duct whose upstream end matches the turbine outlet annulus and which is bifurcated in a plane passing through the axis of the unit, and the bearing housing attachment means may be a bearer member which lies in another axially extending plane normal to the first and passes between the limbs of the duct.

Figure 2:
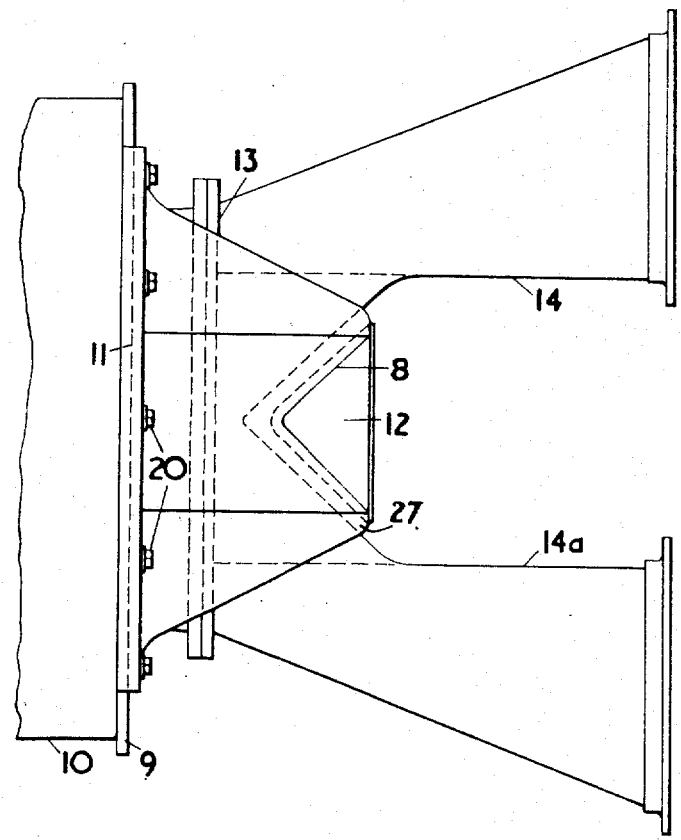

A practical constructional form of the invention is illustrated in the accompanying drawings. Figure 1 represents a vertical elevation, partly cross-sectioned, and Figure 2 the corresponding plan of the outlet end of a gas turbine power unit of small size and designed for high speed operation comprising a two stage centrifugal compressor 21 driven by a two-stage turbine 2, 3 through a common shaft 1, and a combustion system consisting in general of an annular air duct defined on one hand by an inner tubular stationary structure 22 connecting the compressor and turbine casings 23 and 24 respectively and on the other hand by an outer tubular duct wall 10 extending between the casings 23 and 24, the general direction of flow of the working fluid being from the left hand side to the right hand side of the drawings. The annular air duct into which the compressor discharges contains several combustion chambers 16 each having an outlet chute 26 connected to the turbine working fluid annulus, the outer wall of which is the casing 24. Thus each combustion chamber forms with the turbine annulus a flow path for hot working fluid, while the space in the air duct surrounding the combustion chambers forms a duct 25 for relatively cold working fluid before it enters the combustion chambers. The shaft 1 extends in the upstream direction to drive the two-stage compressor and in the downstream direction to receive the drive from the two-stage turbine comprising two discs, 2 and 3, each of which supports the blading for respective stages, axially separated by a spacing member 4. The forward disc 2 abuts on to the shaft 1, while the after disc 3 provides an abutment for a rearwardly extending stubshaft 5, the shaft 1, discs 2 and 3, spacing member 4, and stubshaft 5 being made hollow to house a tension member 6 receiving at one end nut 7 to hold all together. The stubshaft 5 and thus the whole rotor assembly is supported by a bearing 15 mounted in a bearer member 8 extending dilametrically outward therefrom in the longitudinal vertical plane of the unit and bending forwardly at its outer ends 11 and 11a to bolt to a frusto conical annulus 9 mounted on the turbine casing 24. The annulus 9 serves also as a support for and extension of the downstream end of the outer wall 10 of the cold air duct 25 and is thus in direct contact with the cold air flowing therein. The outer ends 11 and 11a of the bearer member 8 are extended laterally to engage a substantial proportion of the circumference of the frusto-conical annulus 9 (see Figure 2), and relative radial location between them over the extent of the engaging surface is ensured by the provision of channels 18 and 18a in the bearer ends 11 and 11a providing complementary engagement with the flange 19 of the frusto-conical annulus 9, the two being secured by spaced bolts 20; by this means ample distribution of load is ensured round the periphery of the frusto-conical annulus 9 and the bearer member is integrated with the main body of the unit in such a way that the parts mutually contribute to the rigidity of each other and the whole.

The exhaust duct, which may be of sheet metal, comprises at its upstream end an annulus 13 which merges downstream almost immediately into divergent ducts 14 and 14a (see the broken lines in Figure 2), one of which passes on either side of the bearer member with an intervening air gap 27 so as to be in heat insulating relationship therewith. The bearer member is cast or fabricated of hollow box girder construction with its radially extending parts of V-shape in cross section so as to be readily accommodated in the apex between the divergent ducts. The arrangement is such as to afford an inner opening in the exhaust annulus for the bearing housing and stubshaft of the turbine.

The constructional embodiment of the invention described illustrates clearly, as a study of the drawings will show, the objections to the overhung arrangement of the turbine previously referred to; it would be impracticable to accommodate a bearing close to the upstream side of the turbine without considerably reducing the axial pitch of the bearings (upon which the critical whirling speeds are dependent) and increasing the diameter of the combustion system and hence the maximum cross-sectional area of the unit.

It will be noted that a construction in accordance with the invention provides a relatively massive support for a rear turbine bearing without seriously obstructing the exhaust or imposing any load on the exhaust structure of the turbine. The invention, as already noted, is of particular value in relation to high speed units of small dimensions and has, in fact, been designed for a unit in which the turbine is of the order of 7 inches in diameter and is intended to operate at speeds of the order of 35,000 R. P. M.

This application is a continuation-in-part of copending application Serial No. 10,866, filed February 25, 1948, now Patent No. 2,564,218, issued August 14, 1951.

I claim:

1. A gas turbine power plant comprising a rotary compressor having a stator structure, an axial flow turbine co-axial with said compressor having stator structure of which a part defines the outer wall of the axial flow passage of the turbine, stationary structure disposed round the common axis of said compressor and turbine and rigidly connecting said compressor stator to said turbine stator, a combustion system disposed about the common axis of and between said compressor and turbine including a flame tube having an outlet chute connected to said axial flow passage of the turbine, a duct wall extending between said compressor and turbine stators and attaching to said outer wall of the latter to define at least partly a cold working fluid duct enclosing said flame tube into which said compressor discharges, said compressor, duct and turbine together affording a working fluid flow path in the direction generally axially of the plant, exhaust ducting extending from the turbine to define a continuation of said working fluid flow path which exhaust ducting is divided to afford a plurality of separate channels spaced apart about the plant axis, bearings for the turbine including one located at its exhaust end, and a support for said exhaust end bearing extending with respect to the plant axis radially outward therefrom between and in spaced relationship with said separate exhaust ducting channels and attaching to said cold working fluid duct wall at a point spaced from both said turbine stator outer wall and said exhaust ducting, said cold working fluid duct wall, between said point of attachment of said bearing support and said turbine stator outer wall, being a substantial load-supporting structure affording a rigid connection between said bearing support and the main stationary structure of the plant while being also in contact with the working fluid in the cold working fluid duct.

2. A gas turbine power plant comprising a rotary compressor having a stator structure, an axial flow turbine co-axial with said compressor having stator structure of which a part defines the outer wall of the axial flow passage of the turbine, stationary structure disposed round the common axis of said compressor and turbine and rigidly connecting said compressor stator to said turbine stator, a combustion system disposed about the common axis of and between said compressor and turbine including a flame tube having an outlet chute connected to said axial flow passage of the turbine, a duct wall extending between said compressor and turbine stators and attaching to said outer wall of the latter to define at least partly a cold working fluid duct enclosing said flame tube into which said compressor discharges, said compressor, duct and turbine together affording a working fluid flow path in the direction generally axially of the plant, exhaust ducting extending from the turbine to define a continuation of said working fluid flow path, bearings for the turbine including one located at its exhaust end, and a support for said exhaust end bearing extending with respect to the plant axis radially outward therefrom substantially in heat-insulating relationship with the exhaust ducting and attaching to said cold working fluid duct wall at a point spaced from both said turbine stator outer wall and said exhaust ducting, said cold working fluid duct wall, between said point of attachment of said bearing support and said turbine stator outer wall, being a substantial load-supporting structure affording a rigid connection between said bearing support and the main stationary structure of the plant while being also in contact with the working fluid in the cold working fluid duct.

3. A gas turbine power plant comprising a rotary compressor having a stator structure, an axial flow turbine co-axial with said compressor having stator structure of which a part defines the outer wall of the axial flow passage of the turbine, a combustion system disposed about the common axis of and between said compressor and turbine including a flame tube having an outlet chute connected to said axial flow passage of the turbine, a duct wall extending between said compressor and turbine stators and attaching to said outer wall of the latter to define at least partly a cold working fluid duct enclosing said flame tube into which said compressor discharges, said compressor, duct and turbine together affording a working fluid flow path in the direction generally axially of the plant, exhaust ducting extending from the turbine to define a continuation of said working fluid flow path, bearings for the turbine including one located at its exhaust end, and a support for said exhaust end bearing extending with respect to the plant axis radially outward therefrom and passing around the exhaust ducting substantially in each heat-insulating relationship therewith and attaching to said cold working fluid duct wall at a point spaced from both said turbine stator outer wall and said exhaust ducting, said cold working fluid duct wall, between said point of attachment of said bearing support and said turbine stator outer wall, being a substantial load-supporting structure affording a rigid connection between said bearing support and said turbine stator structure while being also in contact with the working fluid in the cold working fluid duct.

References Cited in the file of this patent

UNITED STATES PATENTS

| Number | Name | Date |
|---|---|---|
| 2,411,227 | Planiol et al. | Nov. 19, 1946 |
| 2,414,788 | Altorfer et al. | Jan. 28, 1947 |
| 2,459,079 | Johnson et al. | Jan. 11, 1949 |
| 2,469,439 | Lundquist | May 10, 1949 |
| 2,470,126 | Altorfer | May 17, 1949 |
| 2,490,784 | Davenport | Dec. 13, 1949 |